Jan. 13, 1953 W. J. GRUEN ET AL 2,625,603

TELEVISION PULSE SEPARATION CIRCUIT

Filed Aug. 11, 1950

Inventors:
Wolf J. Gruen,
Theodore V. Zaloudek,
by Merton D. Moore
Their Attorney.

Patented Jan. 13, 1953 2,625,603

UNITED STATES PATENT OFFICE 2,625,603

TELEVISION PULSE SEPARATION CIRCUIT

Wolf J. Gruen, Syracuse, and Theodore V. Zaloudek, Liverpool, N. Y., assignors to General Electric Company, a corporation of New York Application August 11, 1950, Serial No. 178,848

10 Claims. (Cl. 178—7.3)

Figure 1:
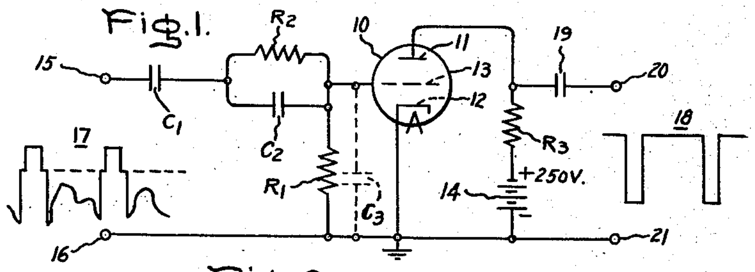

Our invention relates to pulse separation circuits and particularly to circuits adapted for use in television broadcast receivers for separating the horizontal and vertical synchronizing pulses from the remainder of a composite television signal.

In accordance with current television broadcasting standards in the United States, the composite television signal, which is modulated upon the picture carrier wave, comprises a train of relatively narrow horizontal synchronizing pulses recurring at the end of each scanning line and a train of relatively wide vertical synchronizing pulses recurring at the end of each complete picture field. These pulses all have the same amplitude with respect to a unidirectional reference voltage level corresponding to zero carrier amplitude, and this amplitude is greater than the maximum amplitude of any of the interspersed picture signal components.

In present-day systems employing 525 scanning lines per complete picture frame, and 30 frames per second, with interlaced scanning, the horizontal synchronizing pulses recur at the relatively high frequency of 15,750 per second and the vertical synchronizing pulses recur at the relatively low frequency of 60 per second. For reasons well understood by those skilled in the art and which are not material to the present invention, the wide vertical synchronizing pulses are also slotted at twice the line scanning rate and additional equalizing pulses are inserted just preceding and following each vertical synchronizing pulse, these equalizing pulses recurring at twice the horizontal scanning frequency.

The horizontal and vertical synchronizing pulses are separated from the remainder of the picture signal in the television receiver and utilized to synchronize the horizontal and vertical scanning wave generators, as is well known. It is common practice to accomplish this separation by means of a peak detector circuit which effectively clips off all portions of the composite signal below the synchronizing pulse level and which normally passes only the synchronizing pulses. Such a simple amplitude clipper circuit is satisfactory so long as only the received synchronizing pulses extend above the clipping level, but spurious "noise" impulses are also very often received which likewise have sufficient amplitude to pass through the clipper. These "noise" pulses may be single or random impulses of short duration, such as those due to lightning or other atmospheric disturbances, or they may be of sustained, recurrent character, such as interference from automotive ignition systems, fluorescent lighting systems or other electrical apparatus. If these "noise" impulses are of sufficient amplitudes or of sufficiently high repetition rates, they will quickly charge up an ordinary peak detector circuit to a point where it will not pass all synchronizing pulses, resulting in loss of synchronization in the reproduced television picture. The problem is presented, therefore, of providing a synchronizing pulse separation circuit which is effective to pass pulse components recurring at both the high and low synchronizing frequencies and which is relatively unresponsive to interfering pulses that may have greater amplitudes and frequency components extending over a very wide frequency spectrum. It is a primary object of our invention to provide an improved synchronizing pulse separation circuit which realizes these objectives to a maximum extent.

It is another object of our invention to provide an improved television synchronizing pulse separator circuit which is simple and inexpensive, requires a minimum number of circuit components and which nevertheless provides a high degree of discrimination against unwanted interfering pulse signals.

Still another object of our invention is to provide an improved television synchronizing pulse separation circuit which is easily adjusted and aligned for effective operation over a wide range of input signal levels.

Yet another object of our invention is to provide an improved synchronizing pulse separation circuit which passes both horizontal and vertical synchronizing pulses with substantially equal efficiency, and which effectively discriminates against interfering "noise" pulses.

For additional objects and advantages and for a better understanding of our invention, attention is now directed to the following description and accompanying drawing. The features of the invention believed to be novel are particularly pointed out in the appended claims.

Figures 2, 3:
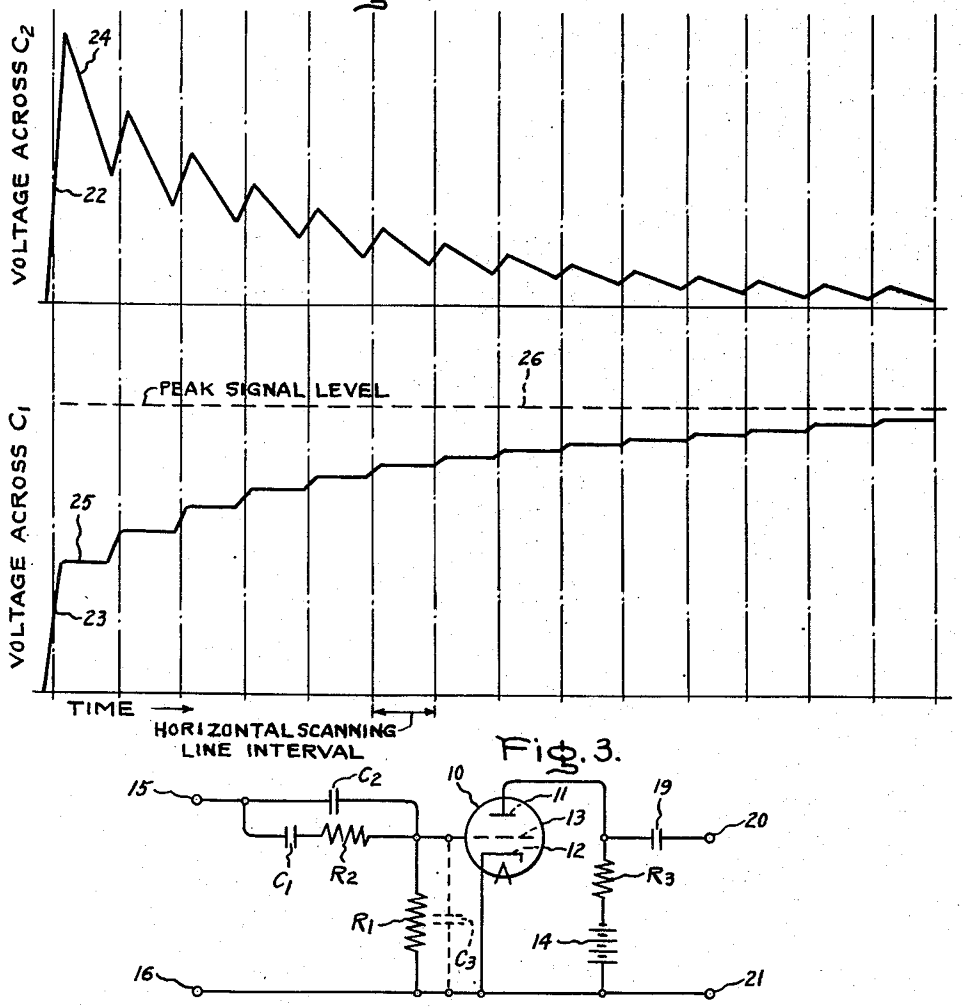

In the drawings, Fig. 1 is a schematic diagram of a preferred circuit embodying our invention; Fig. 2 is a graphical representation of two voltage wave forms on a common time scale which will be referred to in analyzing the electrical characteristics of the circuit of Fig. 1; and Fig. 3 is a schematic diagram of a modification of the circuit of Fig. 1.

The circuit of Fig. 1 comprises an electron discharge amplifier 10 including an anode 11, cathode 12 and control grid 13. Cathode 12 is connected directly to a point of fixed reference potential, conventionally represented as ground, and anode operating potential is impressed upon anode 11 through anode load resistor $R_3$ from the positive terminal of a suitable power supply source, represented conventionally by the battery 14.

The incoming composite television picture signal from which the synchronizing pulses are to be separated is impressed upon a pair of input terminals 15 and 16, the lower terminal 16 being grounded. This signal is of the conventional form previously described, and may, for example, be the demodulated signal output from the second detector of a television broadcast receiver. As is indicated by the conventional wave form 17 in Fig. 1, it is impressed between the terminals 15 and 16 in such polarity that the synchronizing pulses are positive at the terminal 15.

The input terminals 15, 16 are coupled to the grid circuit of amplifier 10 through a coupling network comprising a shunt resistor $R_1$ connected between grid 13 and cathode 12, a pair of coupling capacitors $C_1$ and $C_2$ in series, and a discharge resistor $R_2$ connected directly in parallel with capacitor $C_2$. The inherent input capacity of the amplifier 10 is represented by the dotted capacitor $C_3$ in shunt to resistor $R_1$. As will be pointed out subsequently, in some cases it may be desirable to supplement this capacity by an additional physical capacitor in shunt to $R_1$.

The clipped and amplified synchronizing pulses, represented schematically at 18 in Fig. 1, are supplied through a blocking capacitor 19 to a pair of output terminals 20 and 21 which may be connected to any suitable load circuit (not shown).

In its basic aspects, the circuit of Fig. 1 develops a negative self-bias through well-known grid-leak detector action, sufficient to clip or suppress all of the composite signal at its output except the synchronizing pulse components. Thus, the control grid 13 and cathode 12 function as the anode and cathode of a diode detector whose load impedance is the resistance-capacitance combination $R_1$, $C_1$, $R_2$, $C_2$. However, the circuits of our invention differ in several important respects from conventional prior art circuits of this general type which employ a simple shunt grid resistor and series capacitor. As previously indicated, the horizontal and vertical synchronizing pulses contain widely different frequency components by reason of their widely different repetition rates. In prior art circuits of this general type, it has been necessary to achieve a compromise in the circuit constants of the grid circuit between constants most suitable for passing the high frequency horizontal pulses and for passing the low frequency vertical pulses. In order to obtain good clipping performance under high "noise" conditions, it is desirable to provide a relatively short time constant (i. e., product of resistance times capacitance) in the grid circuit, so that the tube cannot bias itself beyond cut-off for a long enough time interval to cause loss of horizontal synchronization. On the other hand, in order to maintain accurate vertical synchronization, it is necessary to transmit the low frequency components of the vertical synchronizing pulses, and this ideally requires a relatively long time constant in the grid circuit.

In accordance with our invention, the circuit constants of the grid coupling network are so selected that efficient transmission of the frequency components of both horizontal and vertical synchronizing pulses is achieved, without compromise and without introducing difficulties in maintaining synchronization in the presence of "noise." The most important criteria are as follows:

(1) The capacity of $C_1$ should be many times that of $C_2$, preferably of the order of ten to one hundred times or more;

(2) The time constant $R_1C_1$ should be long enough to permit the capacitor $C_1$ to hold its charge without substantial loss during the interval between consecutive vertical synchronizing pulses. That is, it should be of the same order of magnitude as the time period between consecutive vertical synchronizing pulses, and preferably somewhat longer;

(3) The time constant $R_2C_2$ should be short enough to permit $C_2$ to discharge to a substantial extent during the period between consecutive vertical synchronizing pulses. That is, it should be preferably of the order of the time period of at least one horizontal scanning line but not more than the duration of a few scanning lines; and (4) For equal transmission of the horizontal and vertical pulses, the ratio of $R_1$ to $R_2$ should be approximately equal to the ratio of the capacitive impedance of $C_2$ to the dynamic input impedance of the separator tube. If a high gain tube is employed, this dynamic input impedance is normally capacitive as indicated by capacitor $C_3$ in Fig. 1, but if not, it may be necessary to add external capacity, as previously mentioned.

If the above conditions are met, the operation of the circuit may readily be analyzed as follows. Assume that the composite television picture signal is suddenly applied, at the beginning of a picture field, to the input terminals 15 and 16, which have previously been open. During each horizontal synchronizing pulse, the grid 13 now draws current through the capacitors $C_1$ and $C_2$ in series. During the first horizontal synchronizing pulse, the capacitor $C_2$ is rapidly charged along the line 22 in Fig. 2 and the capacitor $C_1$ is charged along the line 23. Since essentially the same charging current flows through both capacitors for the short duration of a horizontal synchronizing pulse, the ratio of the voltages across the individual capacitors at the end of the first pulse is approximately equal to the inverse ratio of their capacity values. Also, since $C_2$ has been selected to be very much smaller than $C_1$, most of the voltage consequently appears across $C_2$. During the time interval preceding the next horizontal synchronizing pulse, the capacitor $C_2$ discharges relatively rapidly through resistor $R_2$, for example, along the line 24 in Fig. 2. The voltage in capacitor $C_1$ remains substantially constant during this interval, however, as indicated by the horizontal line 25, due to the relatively long time constant of $R_1C_1$. As time goes on, and the charging and discharging cycles follow each other as indicated in Fig. 2, capacitor $C_1$ will eventually be charged substantially up to the positive peak amplitude of the composite television signal, represented by the horizontal dashed line 26. From that time on, the grid current need only be sufficient to replace the relatively small amount of charge which is lost on $C_1$ during the discharging cycle between consecutive synchronizing pulses. Thus, the voltage across $C_2$ eventually decreases to a relatively low value as shown in Fig. 2. For purposes of illustration only, the curves of Fig. 2 have been drawn for a capacity ratio of 2:1 and indicate that this state of equilibrium is obtained in an interval corresponding to about ten horizontal scanning lines. However, in practice the capacity ratio should be very much higher than this, resulting in a much longer charging time for $C_1$. This insures that the charge on $C_1$ is not affected to any appreciable degree by short time duration random noise pulses, even under weak signal conditions. At the same time, the short time constant $R_2C_2$ insures a fast recovery time of the clipper stage after each noise pulse.

To simplify the drawing, the waveforms during the intervals of the equalizing and vertical synchronizing pulses have not been indicated, but it will readily be apparent to those skilled in the art that the only changes are in the widths of the small serrations in the voltage across $C_2$ and that the fundamental operation of the circuit is not altered.

It will thus be apparent that, under steady state conditions with no interfering "noise" pulses present, capacitor $C_1$ is charged substantially to the peak voltage of the synchronizing pulses and that it holds this voltage substantially constant over many horizontal pulse periods. The charge on capacitor $C_2$ is then only that necessary to equal the loss in voltage on capacitor $C_1$ between consecutive synchronizing pulses. If short, intense, "noise" impulses are now received, $C_2$ will receive most of the charge caused by such pulses and they will be rapidly discharged through the short time constant circuit $R_2C_2$ (so long as they are not sufficiently sustained to give the same effect as horizontal synchronizing pulses). At the same time, the lower frequency components of the vertical synchronizing pulses are readily transmitted due to the correspondingly long time constant $R_1C_1$. As previously indicated, substantially equal transmission efficiencies can also be obtained for both types of synchronizing pulses by fulfilling the conditions outlined under (4) above.

Fig. 3 shows a modification of the circuit of Fig. 1. Since it merely involves a slight rearrangement of the same circuit elements as Fig. 1, corresponding reference symbols have been employed. It will be apparent that it differs from the circuit of Fig. 1 only in that the large coupling capacitor $C_1$ is placed in series with discharge resistor $R_2$ across the small coupling capacitor $C_2$. Since $C_1$ is much larger than $C_2$, as previously explained, the operation of the circuit does not differ substantially from that of Fig. 1, the small coupling capacitor $C_2$ being able to discharge to a considerable extent through $C_1$ and $R_2$ during each horizontal scanning line interval.

However, it will be noted that in this circuit, $C_1$ is not charged simultaneously with $C_2$, but is charged by the discharge of $C_2$ through $R_2$. Consequently, the amplitude-time characteristics of the charging and discharging curves for the capacitors will be of somewhat different shapes from those shown in Fig. 2.

Merely by way of illustration and not in any sense by way of limitation, the following are representative circuit constants for the circuit of Fig. 1 which we have found to be satisfactory under actual operating conditions in a television broadcast receiver adapted to receive 525-line, 30-frame, standard interlaced television signals:

$C_1$=.01 mf.
$C_2$=220 mmf.
$C_3$=dynamic input capacity of tube 10
$R_1$=3 megohms
$R_2$=1 megohm
$R_3$=47,000 ohms
Tube 10: ½6SL7GT
Plate voltage source 14: 250 volts With these particular circuit values, it will be noted that the time constant $R_1C_1$ equals .03 second (disregarding the relatively low output impedance of the preceding stage) and that this is about twice the field synchronizing period of .01667 second. The time constant $R_2C_2$ is equal to 220 microseconds, which corresponds to approximately four horizontal line periods of 63.5 microseconds each. Assuming that the dynamic input impedance of the tube 10 is that of a capacitance of approximately 50 to 75 mmf., the ratio of the capacitive impedance of $C_2$ to the dynamic input impedance is approximately the same as the ratio of $R_1$ to $R_2$, thus fulfilling the condition (4) previously specified for substantially equal transmission of the horizontal and vertical synchronizing pulses.

Television broadcast receivers embodying the circuit of this invention have amply demonstrated that horizontal synchronization can be satisfactorily maintained even under weak signal conditions with attendant "noise" which would paralyze a conventional receiver, and that fully adequate vertical synchronizing pulse output can be secured despite the fast recovery time of the separator circuit in the presence of "noise" pulses.

While two specific embodiments of our invention have been shown and described, it will, of course, be understood that various other modifications may be made without departing from the invention. The appended claims are therefore intended to cover any such modifications within the true spirit and scope of our invention.

What we claim as new and desire to secure by Letters Patent of the United States is:

1. A pulse separation circuit for clipping two groups of time-interlaced periodic pulses from a composite signal wherein said pulses are all of the same polarity and of substantially equal peak amplitudes, said first group comprising pulses recurring at relatively short time intervals and said second group comprising pulses recurring at relatively long time intervals, comprising, in combination, an electron discharge device including an anode, a cathode and a control grid, a connection from said cathode to a point of reference potential, an input terminal, means for impressing said composite signal on said terminal with said pulses in positive polarity with respect to said point, an input coupling network comprising a pair of unequal coupling capacitors $C_1$ and $C_2$ serially connected in the order named between said terminal and said grid, a resistor $R_1$ connected in a shunt circuit between one terminal of capacitor $C_2$ and said point, and a discharge resistor $R_2$ connected in a discharge circuit across $C_2$, the capacity of $C_1$ being substantially greater than that of $C_2$, the time constant $R_1C_1$ being of the same order of magnitude as said long time intervals, the time constant $R_2C_2$ being substantially less than said long time intervals and of the same order of magnitude as said short time intervals, and a pulse output circuit connected between said anode and said cathode.

2. A pulse separation circuit for clipping two groups of time-interlaced periodic pulses from a composite signal wherein said pulses are all of one polarity and of substantially equal peak amplitudes, said first group comprising relatively short periodic pulses recurring at relatively short time intervals and said second group comprising relatively long periodic pulses recurring at relatively long time intervals, comprising, in combination, an electron discharge device having an input electrode, an output electrode, and a cathode, means connecting said cathode to a point of reference potential, an input terminal, means for supplying said composite signal to said input terminal with said pulses in positive polarity with respect to said point, coupling means for impress-said composite signal between said input electrode and said point in such polarity that said pulses tend to cause said device to conduct, said coupling means comprising a grid coupling circuit having a pair of unequal coupling capacitors $C_1$ and $C_2$ connected in a series circuit in the order named between said input terminal and said input electrode, a resistor $R_1$ connected in a shunt circuit between one terminal of capacitor $C_2$ and said point, and a discharge resistor $R_2$ connected in a discharge circuit across $C_2$, the circuit constants of said coupling means being so selected that $C_1$ is much greater than $C_2$, that the time constant $R_1 C_2$ is of the same order of magnitude as said long intervals, and that the time constant $R_2C_2$ is of such lesser order of magnitude that $C_2$ is normally discharged to a substantial extent during a few of said short intervals, and a pulse output circuit connected between said output electrode and said cathode.

3. A pulse clipping circuit for separating the horizontal and vertical synchronizing pulses from a composite television signal of the type wherein said pulses are all of one polarity and of substantially equal peak amplitudes greater than the peak amplitudes of any interspersed picture signal components, said horizontal pulses recurring at relatively short time intervals and said vertical pulses recurring at relatively long time intervals, comprising, in combination, an electron discharge device having an input electrode, an output electrode, and a cathode, means connecting said cathode to a point of reference potential, an input terminal, means for impressing said composite signal between said terminal and point with said pulses positive-going at said terminal, coupling means for impressing said composite signal between said input electrode and said point in such polarity that said pulses tend to cause said device to conduct, said coupling means comprising a pair of unequal coupling capacitors $C_1$ and $C_2$ serially connected in the order named between said input terminal and input electrode, a resistor $R_1$ connected in a shunt circuit between one terminal of capacitor $C_2$ and said point, and a discharge resistor $R_2$ connected in circuit in shunt to $C_2$, the circuit constants of said coupling means being so selected that $C_1$ is much greater than $C_2$, that the time constant $R_1C_1$ is substantially longer than said long intervals, and that the time constant $R_2C_2$ is equal to or longer than said short intervals but short enough that $C_2$ is normally discharged to a substantial extent during a few of said short intervals, and a pulse output circuit connected between said output electrode and said cathode.

4. A pulse clipping circuit for separating the horizontal and vertical synchronizing pulses from a composite television signal of the type wherein said pulses are all of one polarity and of substantially equal peak amplitudes greater than the peak amplitudes of any interspersed picture signal components, said horizontal pulses recurring at relatively short time intervals and said vertical pulses recurring at relatively long time intervals, comprising, in combination, an electron discharge device including an anode, a cathode and a control grid, a connection from said cathode to a point of reference potential, an input terminal, means for impressing said composite signal on said terminal in positive polarity with respect to said point, an input coupling network comprising a shunt resistor $R_1$ connected between said grid and said point, a pair of unequal coupling capacitors $C_1$ and $C_2$ serially connected between said terminal and said grid, and a discharge resistor $R_2$ connected in parallel to $C_2$, the capacity of $C_1$ being many times that of $C_2$, the time constant $R_1C_1$ being substantially longer than said long time intervals, the time constant $R_2C_2$ being substantially less than said long time intervals and equal to or longer than said short time intervals, and a pulse output circuit connected between said anode and said cathode.

5. A pulse separation circuit for clipping two groups of pulses from a composite signal wherein said pulses are all of one polarity and of substantially equal peak amplitudes, said first group comprising periodic pulses recurring at relatively short time intervals and said second group comprising periodic pulses recurring at relatively long time intervals, comprising, in combination, an electron discharge amplifier including an anode, a cathode and a control grid, a connection from said cathode to a point of reference potential, an input terminal, means for impressing said composite signal on said input terminal in positive polarity with respect to said point, an input coupling network comprising a shunt resistor $R_1$ connected between said grid and said point, a pair of unequal coupling capacitors $C_1$ and $C_2$ each connected in a series circuit between said terminal and said grid and a discharge resistor $R_2$ connected in a discharge circuit in shunt to $C_2$, the capacity of $C_1$ being substantially greater than that of $C_2$, the time constant $R_1C_1$ being substantially greater than said long time intervals, the time constant $R_2C_2$ being of the same order of magnitude as said short time intervals, the ratio of $R_1$ to $R_2$ being approximately equal to the ratio of the reactance of $C_2$ to the dynamic input impedance of said amplifier, and a pulse output circuit connected between said anode and cathode.

6. A television synchronizing pulse separation circuit for separating the unidirectional horizontal and vertical synchronizing pulses from a composite television signal in which all said pulses are of substantially different time durations and of equal amplitudes exceeding the peak amplitudes of interspersed picture signal components, said horizontal pulses recurring at the line scanning frequency or a multiple thereof and said vertical pulses recurring at the field scanning frequency, comprising, in combination, an electron discharge amplifier including an anode, a cathode and a control grid, a grid coupling network having first and second input terminals, means for impressing said composite signals on said terminals with said pulses positive at said second terminal, said first terminal being conductively connected to said cathode, said second terminal being connected to said grid through two unequal coupling capacitors $C_1$ and $C_2$ in series, said network also comprising a coupling resistor $R_1$ connected between said grid and cathode and a discharge resistor $R_2$ connected in shunt to $C_2$, the circuit constants of said network being so selected that the capacity of $C_1$ is much larger than that of $C_2$, so that the time constant $R_1C_1$ is substantially longer than the relatively long time period between consecutive vertical pulses and that the time constant $R_2C_2$ is equal to or somewhat longer than the relatively short time period between consecutive horizontal pulses but short enough for $C_2$ normally to discharge through $R_2$ to a substantial extent during a few of each said short periods, and a pulse output circuit connected between said anode and cathode.

7. A television synchronizing pulse separation circuit for separating the unidirectional horizontal and vertical synchronizing pulses from a composite television signal in which all said pulses are of substantially different time durations and of equal amplitudes exceeding the peak amplitudes of interspersed picture signal components, said horizontal pulses recurring at the line scanning frequency or a multiple thereof and said vertical pulses recurring at the field scanning frequency, comprising, in combination, an electron discharge amplifier including an anode, a cathode and a control grid, a grid coupling network having first and second input terminals, means for impressing said composite signal on said terminals with said pulses positive at said second terminal, said first terminal being conductively connected to said cathode, said second terminal being connected to said grid through two unequal coupling capacitors $C_1$ and $C_2$ in series, said network also comprising a coupling resistor $R_1$ connected between said grid and cathode and a discharge resistor $R_2$ connected in shunt to $C_2$, the circuit constants of said network being so selected that the capacity of $C_1$ is much larger than that of $C_2$, that the time constant $R_1C_1$ is substantially longer than the time period between consecutive vertical pulses, that the time constant $R_2C_2$ is short enough for $C_2$ to be discharged to a substantial extent during the time period of a few consecutive horizontal pulses, and that the ratio of $R_1$ to $R_2$ is approximately equal to the ratio of the reactance of $C_2$ to the dynamic input impedance of said amplifier, and a pulse output circuit connected between said anode and cathode.

8. A pulse separation circuit for clipping two groups of time-interlaced periodic pulses from a composite signal wherein said pulses are all of the same polarity and of substantially equal peak amplitudes, said first group comprising pulses recurring at relatively short time intervals and said second group comprising pulses recurring at relatively long time intervals, comprising, in combination, an electron discharge device including an anode, a cathode and a control grid, a connection from said cathode to a point of reference potential, an input terminal, means for impressing said composite signal on said terminal with said pulses in positive polarity with respect to said point, an input coupling network comprising a first coupling capacitor $C_1$ and a discharge resistor $R_2$ serially connected in the order named between said terminal and said grid, a second coupling capacitor $C_2$ connected in circuit between said terminal and said grid, and a shunt resistor $R_1$ connected in circuit between said grid and said point, the capacity of $C_1$ being substantially greater than that of $C_2$, the time constant $R_1C_1$ being of the same order of magnitude as said long time intervals, the time constant $R_2C_2$ being substantially less than said long time intervals and of the same order of magnitude as said short time intervals, and a pulse output circuit connected between said anode and said cathode.

9. A pulse clipping circuit for separating the horizontal and vertical synchronizing pulses from a composite television signal of the type wherein said pulses are all of one polarity and of substantially equal peak amplitudes greater than the peak amplitudes of any interspersed picture signal components, said horizontal pulses recurring at relatively short time intervals and said vertical pulses recurring at relatively long time intervals, comprising, in combination, an electron discharge device including an anode, a cathode and a control grid, a connection from said cathode to a point of reference potential, an input terminal, means for impressing said composite signal on said terminal in positive polarity with respect to said point, an input coupling network comprising a shunt resistor $R_1$ connected between said grid and said point, a first coupling capacitor $C_1$ and a discharge resistor $R_2$ serially connected between said terminal and said grid, and a second coupling capacitor $C_2$ connected between said terminal and said grid, the capacity of $C_1$ being many times that of $C_2$, the time constant $R_1C_1$ being substantially longer than said long time intervals, the time constant $R_2C_2$ being substantially less than said long time intervals and longer than said short time intervals, and a pulse output circuit connected between said anode and said cathode.

10. A television synchronizing pulse separation circuit for separating the unidirectional horizontal and vertical synchronizing pulses from a composite television signal in which all said pulses are of substantially different time durations and of equal amplitudes exceeding the peak amplitudes of interspersed picture signal components, said horizontal pulses recurring at the line scanning frequency or a multiple thereof and said vertical pulses recurring at the field scanning frequency, comprising, in combination, an electron discharge amplifier including an anode, a cathode and a control grid, a grid coupling network having first and second input terminals, means for supplying said composite signal to said terminals with said pulses positive at said second terminal, said first terminal being conductively connected to said cathode, a shunt resistor $R_1$ connected between said grid and said first terminal, a first coupling capacitor $C_1$ in series with a discharge resistor $R_2$ connected between said second terminal and said grid, a second coupling capacitor $C_2$ connected in shunt with the series connection of $C_1$ and $R_2$, and a grid coupling resistor $R_1$ connected in circuit between said grid and cathode, the circuit constants of said network being so selected that the capacity of $C_1$ is much larger than that of $C_2$, that the time constant $R_1C_1$ is substantially longer than the time period between consecutive vertical pulses that the time constant $R_2C_2$ is short enough for $C_2$ to be discharged to a substantial extent during the time period of a few consecutive horizontal pulses, and that the ratio of $R_1$ to $R_2$ is approximately equal to the ratio of the reactance of $C_2$ to the dynamic input impedance of said amplifier, and a pulse output circuit connected between said anode and cathode.

WOLF J. GRUEN.
THEODORE V. ZALOUDEK.

REFERENCES CITED

The following references are of record in the file of this patent:

UNITED STATES PATENTS

| Number | Name | Date |
|---|---|---|
| 1,990,781 | Fitch | Feb. 12, 1935 |
| 2,178,736 | Campbell | Nov. 7, 1939 |
| 2,214,077 | Farnsworth | Sept. 10, 1940 |
| 2,354,032 | Lyman | July 18, 1944 |